United States Patent [19]

Hardy

[11] Patent Number: 5,036,668
[45] Date of Patent: Aug. 6, 1991

[54] ENGINE INTAKE TEMPERATURE CONTROL SYSTEM

[75] Inventor: James A. Hardy, Playa Del Rey, Calif.

[73] Assignee: Allied-Signal Inc., Morristown, N.J.

[21] Appl. No.: 547,666

[22] Filed: Jul. 3, 1990

[51] Int. Cl.⁵ ............................................. F02B 29/00
[52] U.S. Cl. ..................................... 60/599; 123/563
[58] Field of Search ................. 123/563; 60/599, 286, 60/279, 280, 287, 291, 311

[56] References Cited

U.S. PATENT DOCUMENTS

| | | |
|---|---|---|
| 2,369,937 | 2/1945 | Baster . |
| 2,552,695 | 5/1951 | Titze . |
| 3,336,911 | 8/1967 | Steiger . |
| 3,397,684 | 8/1968 | Scherenberg . |
| 3,450,109 | 6/1969 | Gratzmuller . |
| 3,595,013 | 7/1971 | Brille et al. . |
| 3,712,282 | 1/1973 | Isley ................................ 123/563 |
| 3,894,392 | 7/1975 | Melchior ........................... 60/599 |
| 4,000,725 | 1/1977 | Harris .............................. 123/563 |
| 4,077,219 | 3/1978 | Melchior et al. . |
| 4,122,679 | 10/1978 | Charron . |
| 4,186,560 | 2/1980 | Frankl . |
| 4,207,848 | 6/1980 | Dinger et al. . |
| 4,385,496 | 5/1983 | Yamane ............................. 60/599 |
| 4,483,150 | 11/1984 | Melchior et al. . |
| 4,539,815 | 9/1985 | Garcea . |
| 4,545,357 | 10/1985 | Kearsley et al. . |
| 4,835,963 | 6/1989 | Hardy ............................... 60/280 |

FOREIGN PATENT DOCUMENTS

| | | | |
|---|---|---|---|
| 0052018 | 4/1977 | Japan ................................ 60/599 |
| 0082515 | 5/1984 | Japan ................................ 60/274 |
| 0201309 | 8/1988 | Japan ................................ 60/286 |
| 1255956 | 12/1971 | United Kingdom ............... 123/563 |
| 2055963 | 3/1981 | United Kingdom ................ 60/599 |

Primary Examiner—Andrew M. Dolinar
Assistant Examiner—M. Macy
Attorney, Agent, or Firm—Ken C. Decker; William N. Antonis

[57] ABSTRACT

A combustion air induction system for an internal combustion engine equipped with a turbocharger to provide charge air to the engine includes a pair of heat exchangers arranged in series in the conduit communicating the charge air outlet of the turbocharger to the induction manifold of the engine. Charge air from the turbocharger first travels through a charge air to engine coolant heat exchanger, and then travels through a charge air to ambient air heat exchanger. A bypass passage is controlled by a valve to bypass charge air around the charge air to ambient air heat exchanger under predetermined conditions.

3 Claims, 1 Drawing Sheet

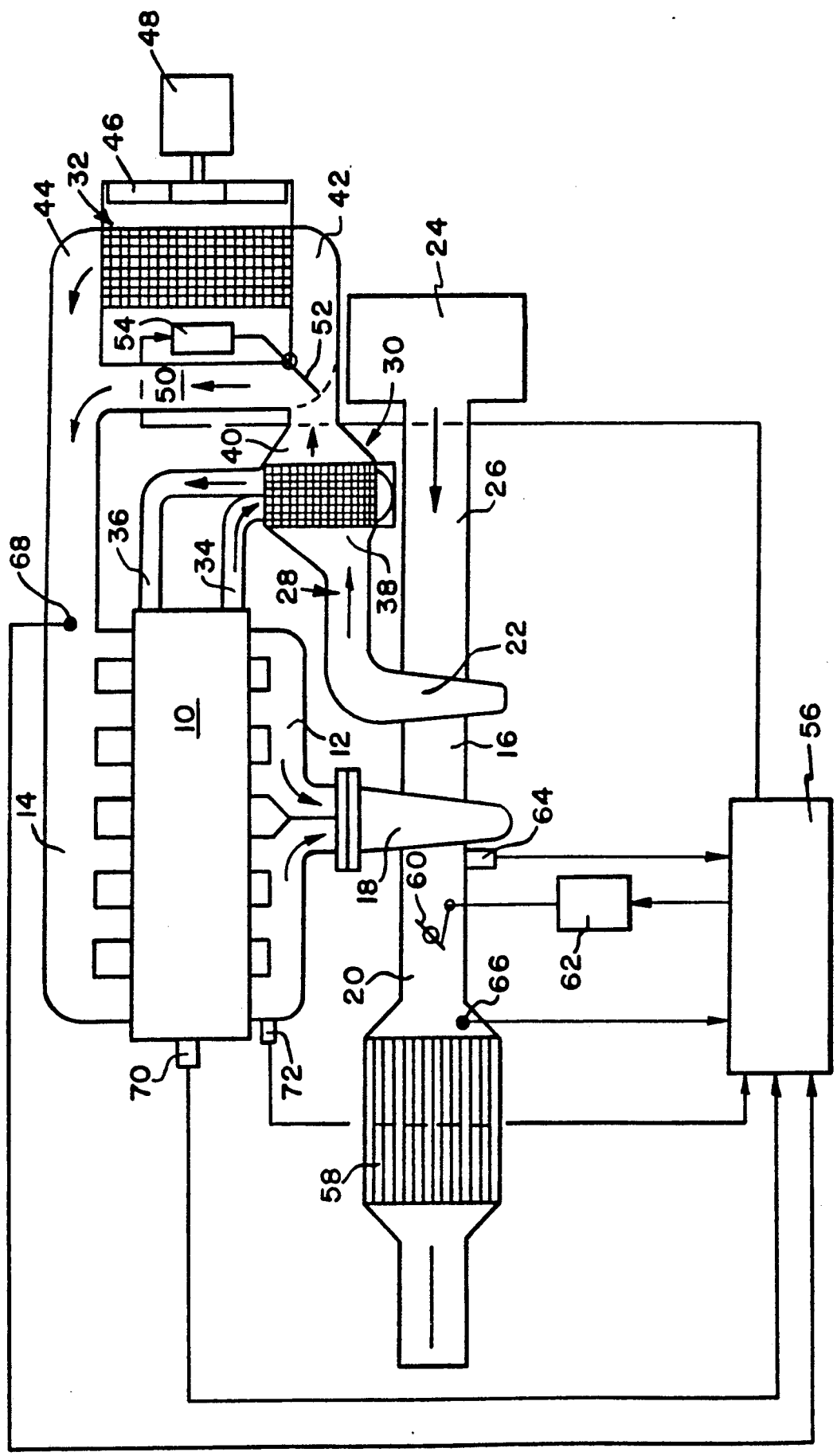

ENGINE INTAKE TEMPERATURE CONTROL SYSTEM

This invention relates to a method and apparatus controlling the temperature of the combustion air to the intake manifold of an internal combustion engine.

To control emissions, it is often desirable to control the temperature of combustion air used by internal combustion engines. Since such engines used in heavy duty applications (such as on heavy duty trucks and buses or construction equipment) are often equipped with a turbocharger, the temperature of the combustion air is inherently raised by compression of the combustion air effected by the turbocharger. Combustion air which has been compressed by a turbocharger is commonly referred to as charge air. In diesel engines, high temperatures of combustion or charge air communicated to the intake manifold of the engine can have deleterious effects on the nitrous oxide (NOX) emissions, which must be controlled pursuant to recently adopted governmental regulations. On the other hand, when such engines are operated in cold weather at low engine loading conditions, the temperature of the combustion air is quite low. Low temperature combustion air results in increased emission of heavy hydrocarbon particulates. Accordingly, it is desirable to warm the cold air above the temperature at which the heavy hydrocarbons are no longer produced in quantity.

It has also been necessary to design particulate traps for the exhaust systems of such engines to reduce the emission of soot and other particulate matter. These particulate traps must be regenerated by burning off the particulate periodically. Such a particulate trap and regeneration control is disclosed in U.S. Pat. No. 4,835,963. During regeneration of the particulate trap, it is desirable that the temperature of the combustion air also be increased, since regeneration of the trap is effected by backpressuring the engine to increase the temperature of the exhaust gas to a level at which the particulate matter can be burned off in a controlled regeneration.

Accordingly, the present invention is particularly advantageous when used on vehicles equipped with a particulate trap, although the present invention is intended for use on both vehicles equipped with such a trap and those which are not so equipped.

The present invention effects control of the combustion air used in an internal combustion engine by providing an exhaust gas driven turbocharger to compress filtered ambient air to provide charge air which is communicated to the intake manifold of the engine. A pair of heat exchangers are installed into the conduit communicating the charge air from the turbocharger to the intake manifold. An engine coolant to charge air heat exchanger is installed in the conduit upstream of a charge air to ambient air heat exchanger. A bypass passage and valve permits charge air, under certain conditions, to bypass the charge air to ambient air heat exchanger. Since the temperature of the engine coolant is maintained at about a predetermined temperature, the engine coolant to charge air heat exchanger warms cold charge air, which is then bypassed around the air-to-air heat exchanger. Accordingly, the relatively cold charge air generated at low ambient temperatures and light engine load conditions is warmed by the engine coolant to charge air heat exchanger. The bypass around the charge air to ambient air heat exchanger is closed under normal operating conditions at which the temperature of the charge air generated by the turbocharger must be cooled to control nitrous oxide (NOX) emissions. Since the temperature of the engine coolant is about the same under both conditions, the engine coolant to charge air heat exchanger acts as a precooler to the charge air to ambient air heat exchanger when the charge air must be cooled. Accordingly, the charge air to ambient air heat exchanger can be made smaller than would otherwise be necessary to cool the charge air to an acceptable temperature.

These and other features of the present invention will become apparent from the following description, with reference to the accompanying drawing, the sole Figure of which is a schematic illustration of an internal combustion engine and the associated combustion air induction system and exhaust system.

Referring now to the drawing, a vehicle engine generally indicated by the numeral 10 includes an exhaust manifold 12 and an induction manifold 14. The engine 10 may be a gasoline engine, but is preferably a compression ignition (diesel) engine. The engine 10 is cooled by a liquid coolant, and is equipped with a turbocharger generally indicated by the numeral 16. The turbocharger 16 is conventional, and includes a turbine section 18 which receives exhaust gas from the exhaust manifold 12 and discharges exhaust gas into the exhaust conduit 20. Turbine section 18 includes a turbine wheel (not shown) through which the exhaust gases are passed. The turbine wheel is mounted on a shaft upon which a compressor wheel within compressor section 22 is also mounted. Rotation of the compressor wheel by the turbine wheel draws air in through the air filter 24 and upstream conduit 26 and compresses the air, which is then discharged into downstream conduit 28, which communicates the compressed air, commonly referred to as "charge air", into the induction manifold 14 where the charge air is used for combustion within the engine 10.

Installed in series within the conduit 28 are heat exchangers herein indicated by the numerals 30 and 32. Heat exchanger 30 is an engine coolant to charge air heat exchanger of a design well known to those skilled in the art. Heat exchanger 30 receives coolant from the engine 10 through conduit 34 and returns coolant to the cooling system of the engine 10 through conduit 36. Of course, the engine coolant used by the heat exchanger 30 also passes through the vehicle radiator (not shown) so that, after the engine warms up, the temperature of the coolant is stabilized at a predetermined temperature level. Heat exchanger 30 includes an inlet 38 which receives charge air in the conduit 28 from the outlet of the compressor section 22 of the turbocharger 16, and further includes a discharge 40 through which charge air is discharged to the inlet 42 of the heat exchanger 32. The discharge 44 of the heat exchanger 32 communicates directly to the intake or induction manifold 14 of the engine 10. The heat exchanger 32 is a charge air to ambient air heat exchanger, and is normally located on one side of the vehicle radiator (not shown). Cooling fan 46 and conventional fan drive 48 are provided to force ambient air through the radiator and heat exchanger 32, in a manner well known to those skilled in the art. A bypass passage 50 connects the discharge 40 of heat exchanger 30 directly to the discharge 44 of the heat exchanger 32, thereby bypassing the heat exchanger 32. A conventional pivoting valve 52 is controlled by electromechanical actuator 54 to either close or open the bypass passage 50. When the bypass passage 50 is open, charge air will bypass the heat exchanger 32, but will still pass through the heat exchanger 30. When the bypass passage 50 is closed, charge air will pass through both the heat exchangers 30 and 32. The actuator 54 responds to signals generated by a signal processor 56 to actuate the valve 52. Of course, the bypass valve 52 may be modulated between the fully open and fully closed position to provide charge air at the desired temperature.

A particulate trap 58 is located within the exhaust system 20 so that all of the exhaust gas passing through the exhaust system 20 also passes through the particulate trap 58. The particulate trap 58 traps particulate matter entrained in the exhaust gas and must be regenerated periodically. In order to raise the temperature within the particulate trap 58 to a temperature high enough to initiate and sustain combustion of the particulate matter, the engine is backpressured by operation of the backpressure valve 60. Closure of the backpressure valve 60 increases the temperature of the exhaust gas, in a manner well known to those skilled in the art. Backpressure valve 60 is operated by electromechanical actuator 62, of conventional design. The electromechanical actuator 62 also responds to signals generated by signal processor 56, as more fully disclosed in the aforementioned U.S. Pat. No. 4,835,963. Signal processor 56 receives signals from temperature sensor 64 located at the outlet of the turbine section 18 of turbocharger 16, temperature sensor 66, which represents the temperature of the particulate trap 58, and a temperature sensor 68, which measures the temPerature of the charge air in the induction manifold 14. The signal from an engine rpm sensor 70 is also transmitted to the signal processor 56. Fuel flow to the engine 10 is controlled by the vehicle operator by an engine fuel control system operated by a fuel rack; accordingly, the signal from an engine fuel rack position sensor 72 is also transmitted to the signal processor 56.

As is known to those skilled in the art, the load on the engine is a function of engine speed and rack position. Accordingly, an engine map is determined empirically in which an optimum temperature in the induction manifold 14 is established as a function of rack position and engine speed. This map is stored in memory of the processor 56 so that an optimum temperature of the charge air in induction manifold 14 may be determined for each value of rack position and engine speed. If the temperature sensed by the sensor 68 is less than the optimum temperature, actuator 54 moves valve 52 to a position directing all of the charge air from the discharge 40 of heat exchanger 30 into the bypass passage 50. Accordingly, the charge air under these circumstances will not be cooled by the heat exchanger 32, and, if the temperature of the charge air is less than the temperature of the engine coolant, the charge air will be warmed by passage through the heat exchanger 30.

During vehicle cruise and similar engine loading conditions, the temperature of the charge air produced by turbocharger 16 will be increased to a relatively high temperature. As explained above, it is desirable to cool the charge air under these circumstances so that the emission of nitrous oxides are reduced. Accordingly, under these circumstances, the temperature of the charge air will be greater than the optimum value stored in memory of the signal processor 56 for the corresponding rack position and engine speed. The temperature of the charge air under these circumstances also will be above the temperature of the engine coolant. Accordingly, the heat exchanger 30 acts as a precooler, in which the temperature of the charge air is reduced by transfer of heat from the charge air into the engine coolant. The charge air then passes through the heat exchanger 32, where the temperature of the charge air is reduced further by transfer of heat from the charge air to ambient air. Accordingly, the temperature of the charge air is reduced so that emission of nitrous oxide is reduced to an acceptable level. Accordingly, during conditions in which the temperature of the charge air generated by the turbocharger 16 is relatively high, the valve 52 will be positioned by the actuator 54 in a position closing the bypass passage 50, to assure optimum cooling of the charge air by passing through both the heat exchanger 30 and then through the heat exchanger 32.

Under conditions at which the air generated by the turbocharger 16 is relatively cool and below the optimum temperature for the corresponding rack position and engine speed stored in the signal processor 56, the valve 52 will be positioned in a position opening the bypass passage 50 and closing the inlet to the heat exchanger 32, so that the charge air will be directed around the heat exchanger 32. If the temperature of the charge air is below the temperature of the engine coolant in these circumstances, the charge air will be warmed by the engine coolant. The warmer charge air, under these circumstances, reduces the heavy particulate hydrocarbon emissions that would otherwise occur if the charge air had not been warmed.

Furthermore, it is also desirable that the charge air not be cooled significantly during regeneration of the particulate trap 58. Accordingly, when the signal processor determines that regeneration is necessary and initiates a regeneration, in a manner more fully described in the aforementioned U.S. Pat. No. 4,835,963, the signal processor 56 also operates the actuator 54 to move the valve 52 into a position opening the bypass passage 50, so that charge air during regeneration of the particulate trap 58 is bypassed around the heat exchanger 32.

I claim:

1. Combustion air induction system for an internal combustion engine cooled by a liquid engine coolant and having an induction manifold and a turbocharger for compressing ambient air to provide charge air to said induction manifold, comprising conduit means communicating charge air to said induction manifold, a coolant to charge air heat exchanger in said conduit means for transferring heat from said coolant to said charge air and from said charge air to said coolant depending upon the relative temperatures of said coolant and said charge air, and a charge air to ambient air heat exchanger in said conduit means adapted to transfer heat from said charge air to ambient air, said system including a bypass passage for bypassing charge air around said charge air to ambient air heat exchanger, valve means for opening and closing said bypass passage, measuring means for measuring one or more predetermined system parameters, and operating means responsive to said measuring means for operating said valve means to thereby control the temperature of the charge air communicated to the induction manifold in accordance with said parameters, said turbocharger being connected into an engine exhaust discharge system for supplying exhaust gas to said turbocharger for driving the latter, a particulate trap in said exhaust discharge system for trapping particulate matter entrained in said exhaust, and means for regenerating said particulate trap, said operating means being responsive to regeneration of said particulate trap to open said valve means to permit charge air to bypass said charge air to ambient air heat exchanger during regeneration of said particulate trap.

2. Method for delivering charge air at a controlled temperature to the induction manifold of an internal combustion engine cooled by a liquid coolant, comprising the steps of compressing ambient air to provide said charge air, communicating said charge air first through a coolant to charge air heat exchanger and then through a charge air to ambient air heat exchanger, causing said charge air to bypass said charge air to ambient air heat exchanger during low charge air temperature conditions, measuring predetermined system parameters, operating said bypass valve in accordance with said parameters to provide relatively warmer charge air to said induction manifold by bypassing said charge air to ambient air heat exchanger and to supply relatively cooler charge air to said induction manifold by communicating charge air through said charge air to ambient air heat exchanger, said ambient air being compressed by using exhaust gasses from the exhaust system of said internal combustion engine to drive a turbocharger, communicating said exhaust gasses through a particulate trap to trap particulate matter entrained therein, periodically regenerating said trap to dispose of the particulate matter entrained therein, and operating said bypass valve to cause said charge air to bypass said charge air to ambient air heat exchanger during regeneration of said particulate trap.

3. Combustion air induction system as claimed in claim 1, wherein said coolant to charge air heat exchanger and said charge air to ambient air heat exchanger each include an inlet for receiving charge air and a discharge for discharging charge air, the inlet of said coolant to charge air heat exchanger being receiving charge air from said turbocharger, the inlet of said charge air to ambient air heat exchanger receiving charge air from the discharge of said coolant to charge air heat exchanger, the discharge of said charge air to ambient air heat exchanger discharging charge air to said induction manifold.

* * * * *